US007095556B2

(12) United States Patent
Iketaki et al.

(10) Patent No.: US 7,095,556 B2
(45) Date of Patent: Aug. 22, 2006

(54) MICROSCOPE WITH WAVELENGTH COMPENSATION

(75) Inventors: Yoshinori Iketaki, Oume (JP); Takeshi Watanabe, Yamato (JP); Masaaki Fujii, Yokohama (JP); Yasunori Igasaki, Hamamatsu (JP); Toshio Suzuki, Chiba (JP)

(73) Assignees: Japan Science and Technology Agency, Kawaguchi (JP); Olympus Corporation, Tokyo (JP); Hamamatsu Photonics KK, Hamamatsu (JP); Nippon Roper KK, Chiba (JP)

( * ) Notice: Subject to any disclaimer, the term of this patent is extended or adjusted under 35 U.S.C. 154(b) by 366 days.

(21) Appl. No.: 10/771,729

(22) Filed: Feb. 4, 2004

(65) Prior Publication Data

US 2004/0227101 A1    Nov. 18, 2004

(30) Foreign Application Priority Data

Feb. 4, 2003    (JP) ............................. 2003-026796

(51) Int. Cl.
  *G02B 21/06*    (2006.01)
  *G01J 3/30*     (2006.01)
(52) U.S. Cl. .................... 359/385; 356/317; 250/458.1
(58) Field of Classification Search ................ 356/317, 356/318; 250/458.1, 459.1, 201.9; 359/385, 359/368, 370
See application file for complete search history.

(56) References Cited

U.S. PATENT DOCUMENTS 6,859,313 B1 *    2/2005    Iketaki et al. ............... 359/385

* cited by examiner

*Primary Examiner*—Hwa (Andrew) Lee
*Assistant Examiner*—Marissa J Detschel
(74) *Attorney, Agent, or Firm*—Frishauf, Holtz, Goodman & Chick, PC

(57) ABSTRACT

A microscope capable of being shaped into a beam with complete hollow shape by removing the disorder of the wavefront to the erase light, particularly, and capable of improving the spatial resolution by inducing a super-resolution near the limit, is provided. In the microscope, wherein a first light to excite a molecule from a ground-state to first electron excited state or a second light to excite the molecule from the first electron excited state to the second electron excited state with higher energy level, for a sample 56 including the molecule with three electronic states including at least a ground-state, are spatial phase-modulated into the prescribed beam shape, and parts of these first light and the second light are overlapped and focused to detect luminescence from the sample 56, a wavefront compensation means 61 is provided in the optical path of the first light and/or in the optical path of the second light, and the wavefront aberration caused in the first light and/or in the second light, is removed by the wavefront compensation means 61.

9 Claims, 18 Drawing Sheets

*Wavefront detected by wavefront detector*     *Wavefront formed at optical spatial detector*     *Output wavefront*

MICROSCOPE WITH WAVELENGTH COMPENSATION

BACKGROUND OF INVENTION

1. Technical Field that Invention Belongs

The present invention relates to a microscope, particularly, a new optical microscope with high performance and high function so as to obtain a high spatial resolution by illuminating dyed sample with lights of plural wavelengths from a high laser light source of high functionality.

2. Description of Related Technology

The technology of the optical microscope is known at early time, and the microscope of various types has been developed. Moreover, in recent years, the microscope system with high performance has been developed more due to the advancement of the peripheral technology including the laser technology and the electronic images technology.

In such a background, a microscope with high function, capable of controlling the contrast of the obtained image and capable of performing chemical analysis, has been proposed, by the use of the double resonance absorption process generated by illuminating the sample with lights of plural wavelengths (For example, refer to Japanese Patent Application Opened No. 184,552/1996).

This microscope selects a specific molecule by using the double resonance absorption, and observes absorption and fluorescence caused by a specific optical transition. This principle is explained referring to FIGS. 11–14. FIG. 11 shows the electronic structure of the valence electron orbital of the molecule constructing a sample, and first of all, the electron of the valence electron orbital of the molecule in a ground-state (S0 state) shown in FIG. 11, is excited by the light of wavelength $\lambda 1$, thereby assuming the first electron excited state shown in FIG. 12 (S1 state). Next, the electron of the valence electron orbital is excited by the light of another wavelength $\lambda 2$, thereby assuming the second electron excited state shown in FIG. 13 (S2 state). By this excited state, the molecule emits fluorescence light or phosphorescence light, and then returns to the ground-state as shown in FIG. 14.

In the microscopy using the double resonance absorption process, the absorption image and the luminescence image are observed by using the absorption process shown in FIG. 12 and the luminescence of fluorescence and the phosphorescence shown in FIG. 14. In this microscopy, firstly, the molecule constructing the sample with the light of resonant wavelength $\lambda 1$, as shown in FIG. 12, is made to be excited in S1 state by the laser light etc. But in this case, the number of molecule in S1 state within the unit volume increases as intensity of the irradiated light increases.

Here, the linear absorption coefficient is given by the product of the absorption cross section per one molecule and number of molecules per unit volume, so that in the excitation process shown in FIG. 13, the linear absorption coefficient to resonance wavelength $\lambda 2$ of continuously irradiated light, depends on an intensity of firstly irradiated light with wavelength $\lambda 1$. That is, the linear absorption coefficient to wavelength $\lambda 2$ can be controlled by intensity of the light with wavelength $\lambda 1$. This means that if the sample is irradiated by the lights of two wavelengths of wavelength $\lambda 1$ and wavelength $\lambda 2$, and the transmitted image due to the wavelength $\lambda 2$ is obtained, the contrast of the transmitted image can be completely controlled by the light with the wavelength $\lambda 1$.

Moreover, when the de-excitation process due to the fluorescence or phosphorescence in the excited state shown in FIG. 13 can be realized, the emission intensity is proportional to the number of molecules in S1 state. Therefore, the contrast of the image can be controlled even in the case of utilization as the fluorescence microscope.

In addition, in the microscopy using the double resonance absorption process, not only the control of the image contrast, but also the chemical analysis can be realized. That is, the outermost shell valence electron orbital shown in FIG. 11 has an energy level inherent to each molecule, so that the wavelength $\lambda 1$ is different according to the molecule, at the same time, the wavelength $\lambda 2$ becomes also inherent in molecule.

Here, even in case of the illumination by the single wavelength in conventional microscope, the absorption image or the fluorescence imaging of the molecule specified to some degree can be observed, but in general, the wavelength regions of the absorption band in some molecules are overlapped, so that the accurate identification of the chemical composition of the sample can not be performed.

On the contrary, in the microscopy using the double resonance absorption process, the molecule absorbed or emitted by two wavelengths of the wavelength $\lambda 1$ and the wavelength $\lambda 2$, is strictly specific, so that the chemical composition of the sample can be identified more accurately than conventional microscopy. Moreover, in case of exciting the valence election, only the light with a specified electric field vector for molecular axis, is absorbed strongly, so that when the polarizing direction of the wavelength $\lambda 1$ and the wavelength $\lambda 2$ are decided and a picture of the absorption image or the fluorescence imaging is obtained, even the identification of the direction of the orientation can be possible as for the same molecule.

Moreover, in recent years, the fluorescence microscope with a high spatial resolution beyond the diffraction limit by using the double resonance absorption process, is also proposed (For example, refer to Japanese Patent Application Opened No. 100,102/1997).

FIG. 15 is a conceptual diagram of the double resonance absorption process in the molecule, and shows the states that the molecule in ground-state S0 is excited to first electronic excited state S1 with the light of wavelength $\lambda 1$, and is excited to the second electronic excited state S2 with the light of wavelength $\lambda 2$. Moreover, FIG. 15 shows that fluorescence from the second electron excited state S2 of a certain kind of molecule is extremely weak.

A very interesting phenomenon occurs in the case of the molecule with the optical property shown in FIG. 15. FIG. 16 is a conceptual diagram of the double resonance absorption process in the same manner as FIG. 15, X axis as abscissa shows an extension of spatial distance, and shows a spatial area A1 irradiated by the light with wavelength $\lambda 2$ and a spatial domain A0 not irradiated by the light with wavelength $\lambda 2$.

In FIG. 16, a lot of molecules in electron excited state S1 are generated by the excitation of the light with wavelength $\lambda 1$ in spatial domain A0, in this case, the fluorescence emitted with wavelength $\lambda 3$ from the spatial area A0, is seen. However, the light with wavelength $\lambda 2$ is irradiated in the spatial area A1, so that almost molecules of electron excited state S1 are immediately excited in the electron excited state S2 of high order, and thus the molecule in electron excited state S1 does not exist. Such a phenomenon is confirmed by some molecules. As a result, in the spatial area A1, the fluorescence of wavelength $\lambda 3$ is disappear completely, and also the fluorescence from the electron excited state S2 does not exist originally so that the fluorescence is completely controlled in the spatial domain A1 (fluorescent suppression effect) and thus the fluorescence will be emitted only from the spatial area A0.

This has an extremely important meaning on considering from the field of application in the microscope. That is, in the conventional scanning laser microscope etc., the laser beam is focused into a micro-beam by the condenser lens and scans on the sample to be observed, but in that case, the size of the micro-beam becomes a diffraction limit decided by the numerical aperture of the condenser lens and the wavelength of the beam, and thus a spatial resolution better than this limit can not fundamentally be expected.

However, in the case of FIG. 16, by overlapping two kinds of lights with the wavelength $\lambda 1$ and the wavelength $\lambda 2$ spatially and proficiently, and then controlling the fluorescent region by the irradiation of the light with the wavelength $\lambda 2$, for example, on paying attention to the irradiation area of the light with the wavelength $\lambda 1$, a fluorescent region can be narrowed more than the diffraction limit decided by the numerical aperture and the wavelength of the condenser lens, and thus the spatial resolution can be substantially improved. Therefore, by utilizing this principle, a super-resolution microscope, for example fluorescent microscope, that uses the double resonance absorption process better than the diffraction limit, can be achieved.

In addition, the signal to noise ratio can be improved by adjusting the irradiation timing of two lights with the wavelength $\lambda 1$ and the wavelength $\lambda 2$, and the conditions, that effectively causes fluorescent controlling, are proposed, too, as a result, the super-resolution can be developed more effectively (For example, refer to Japanese Patent Application Opened No. 95,120/1999).

To concrete example of such a super-resolution microscopy, it has been proposed that the light (particularly laser beam) with the wavelength $\lambda 1$ by which a fluorescent labeler molecule is excited from the ground-state S0 to the electron excited state S1, is assumed to be a pump light, the light with the wavelength $\lambda 2$ by which the fluorescent labeler molecule is excited from the electron excited state S1 to the electron excited state S2 is assumed to be an erase light, as shown in FIG. 17, the pump light is made radiated from a light source 81, and the erase light is made radiated from a light source 82, respectively, after reflecting on a dichroic mirror 83, the pump light is made focused on a sample 85 by a beam-condensing optical system 84, and after shaping into a hollow beam by a phase plate 86, the erase light is transmitted through the dichroic mirror 83, whereby it spatially overlapped with the pump light. Then, the erase light is focused onto the sample 85 by the beam-condensing optical system 84. (For example, refer to Japanese Patent Application Opened No. 272,340/1997).

According to this microscope, fluorescence intensity from except for the near the optical axis region in which the intensity of the erase light becomes 0, are controlled, so that as a result, only a fluorescent labeler molecule, that exists in a region narrower than the spot size of the pump light, ($\Delta<0.61\cdot\lambda 1/NA$; NA is a numerical aperture of the condensing optical system 84) is observed, and thus the super-resolution is achieved.

Moreover, the phase plate 86 for making the erase light to a hollow beam is generated in such a manner that for example, as shown in FIG. 18, the phase difference $\pi$ is given in at the point symmetrical position to the optical axis. Furthermore, an optical spatial modulator using a liquid crystal plane, or deformable mirror for controlling the shape of the mirror itself with accuracy of the wavelength order, can also be used.

However, it is found that according to the examination of various experiments given by the present inventor etc., the point to be improved as explained hereinafter exists in the conventional super-resolution fluorescent microscope.

Hereafter, the case that a super-resolution fluorescent microscope is constructed as shown in FIG. 19, is explained as an example. The super-resolution fluorescent microscope shown in FIG. 19 is disclosed in Japanese Patent Application Opened No.100,102/2001, and the inventors observe a sample 100 dyed by rhodamine 6G. In this microscope, the laser beam with the wavelength 1064 nm generated from Nd:YAG laser 101 of the mode-locking type is wavelength-converted into a laser beam with a wavelength 532 nm of the second harmonics by a wavelength conversion element 102 consists of $\beta$-$BaB_2O_4$(BBO) crystal, the laser beam is divided into two optical paths of transmitted light and the reflected light by a half mirror 103, the transmitted light is used as a pump light. After transmitting through dichroic mirrors 104 and 105, the transmitted light is made focused on the sample 100 put on two dimensional moving stage 107 by an objective lens 106.

Moreover, after reflected on a reflection mirror 108, the reflected light due to the half mirror 103 is wavelength-converted into the laser beam with the wavelength 599 nm by a Raman shifter 109 consisting of $Ba(NO_3)_2$ crystal. After reflected as an erase light by a reflection mirror 110, the laser beam is shaped to the hollow beam by a phase plate 111, in addition, is aligned with the dichroic mirror 104 on the same axis as the pump light, and thus is made focused on to the sample 100 through the dichroic mirror 105 by the objective lens 106.

On the other hand, after being reflected on the dichroic mirror 105 through the objective lens 106, the fluorescence emitted from the sample 100 is received on a photo multiplier 115 through a fluorescent condenser lens 112, a sharp cut filter 113 and a pin hall 114.

In such a construction of the super-resolution fluorescent microscope, the super-resolution of developing precision is influenced a great deal by the beam shape of the erase light. That is, if an ideal hollow beam is not formed, it is feared that the spatial resolution decreases oppositely, the fluorescence signal decreases, and thus the signal to noise ratio decreases.

Here, the shaping accuracy of the hollow beam depends on the phase modulation technique, that is, the precision of a wavefront control technique. For example, when the wavefront of the erase light falls into disorder by some causes, the shape of the hollow beam crumbles, and the counterbalance of the electric field intensity at a central portion of optical axis becomes imperfect and the electric field intensity remains. Therefore, under such conditions, when the pump light and the erase light are overlapped and focused onto the sample, the intensity of fluorescence is controlled even at the central portion of optical axis, and thus the spatial resolution is not only decreased, but also the signal to noise ratio is decreased.

The cause of the disorder of the wavefront is variously thought, but there are, for example, a distortion of wavefront of laser beam, an error of shape accuracy of respective optical elements, through which the laser beam passes, and an error of the alignment.

SUMMARY OF THE INVENTION

Therefore, considering this respect, an object of the present invention is to provide a microscope, particularly, capable of being shaped into a beam with complete hollow shape by removing the disorder of the wavefront due to the cause to the erase light, thereby inducing a super-resolution near the limit and capable of improving the spatial resolution.

In order to achieve the above object, according to the present invention, there is provided a microscope comprising a means for spatial phase-modulating into the prescribed beam shape a first light to excite a molecule from a ground-state to first electron excited state or a second light to excite the molecule from the first electron excited state to the second electron excited state with higher energy level, for the sample including the molecule with three electronic states including at least a ground-state, a means for focusing and overlapping a part of these first light and second light, a means for detecting light generated from the sample, a wavefront compensating means provided in an optical path of the above first light and/or an optical path of the above second light, and a means for removing wavefront aberration caused in the first light and/or the second light by the wavefront compensator.

Moreover, according to the present invention, in the above microscope, the wavefront compensator has an optical spatial modulator.

In addition, according to the present invention, in the above microscope, the spatial phase distribution measuring means for measuring the spatial phase distribution of the above first light and/or the second light, is provided, and the first light and/or the second light are spatially modulated by the optical spatial modulator based on the spatial phase distribution measured in the spatial phase distribution measuring means.

According to the present invention, in the above microscope, the control unit for feedback controlling the spatial modulation of the first light and/or the second light according to the optical spatial modulator is provided by generating the wavefront compensation data based on the spatial phase distribution measured with the spatial phase distribution measurement means.

Moreover, according to the present invention, in the above microscope, the optical spatial modulator is so constructed that the first light or the second light is spatial phase modulated into the prescribed beam shape.

First of all, the principle of the present invention is explained.

In the present invention, the problem is resolved by removing the disorder of the wavefront due to the wavefront aberration generated by the light source optical system of the microscope with the use of the wavefront compensation method. Therefore, in the preferable embodiment of the present invention, the optical spatial modulator capable of compensating and controlling the wavefront is introduced as a wavefront compensation means. The optical spatial modulator is an optical instrument for artificially giving the phase difference to the incident light to the respective points of the diffraction plane thereby optical-spatially modulating the incident light, and thus the disorder of the wavefront generated by the optical system of the microscope is measured, so that the resolution capability of the super-resolution microscope can be improved to the utmost limit with the wavefront compensation by the optical spatial modulator based on the data.

As such an optical spatial modulator, it is preferable to use the phase control type optical spatial modulator from the viewpoint of a wavefront control. As an example, the optical spatial modulator of double refraction control type (ECB mode) can be used, in which the liquid crystal of the double refraction controlled type is provided, the inclination of the liquid crystal is changed by controlling the voltage that applies to the liquid crystal thereby changing the refraction index, and as a result, the phase of the incident light is controlled two dimensionally, thereby correcting the wavefront (For example, refer to Japanese Patent Application Opened No. 51,340/1994). Thus, according to the present invention, particularly, in the super-resolution microscope, the erase light can be beam-shaped into the complete hollow shape without disorder of the wavefront, as a result, a super-resolution near the limit can be induced, and the spatial resolution can be improved.

DESCRIPTION OF THE PREFERRED EMBODIMENT

Figure 1:
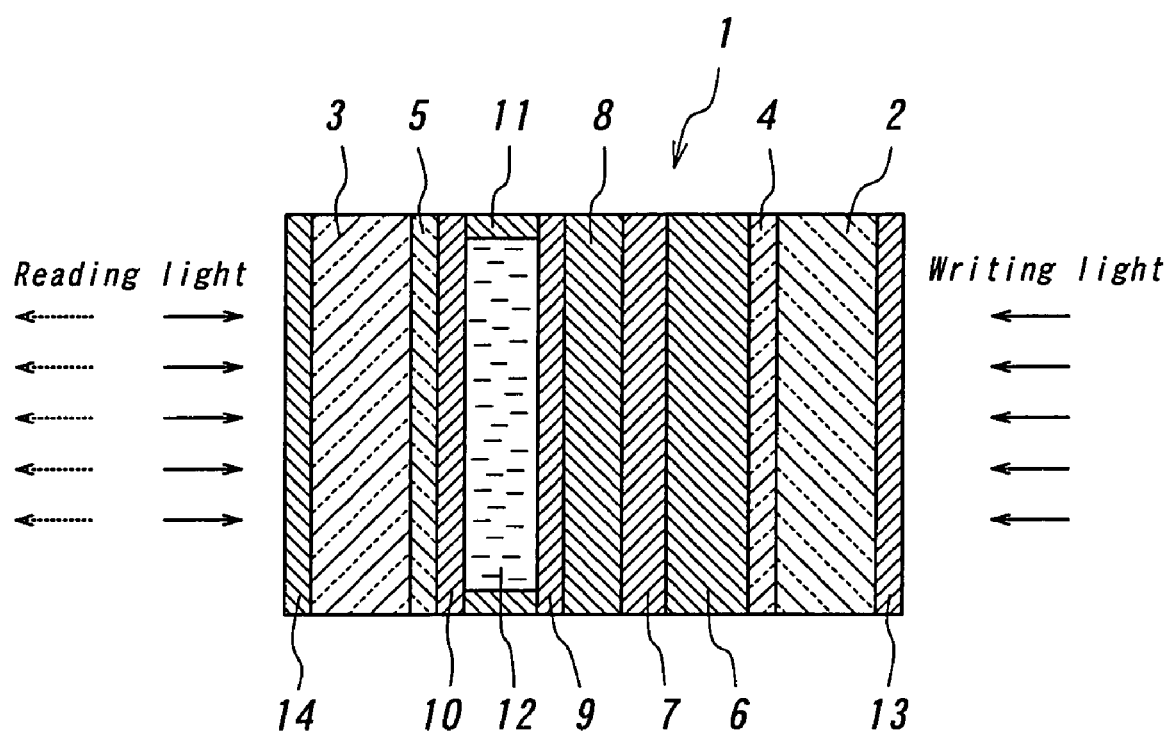
FIG. 1 is a cross-sectional view showing a schematic constructional diagram of one embodiment of the optical spatial modulator used in a microscope according to the present invention.

Hereafter, the present invention is explained in detail with reference to the drawing. FIG. 1 is a cross-sectional view showing a schematic construction of such an optical spatial modulator. (Hereafter, refer to as a liquid crystal type spatial modulator). The optical spatial modulator 1 has a multilayer structure constructed in such a manner that the transparent electrodes (ITO) 4 and 5 are formed on the inner surfaces of two opposed glass substrates 2 and 3, respectively, and a liquid crystal layer 12 orientated in parallel which has been sandwiched by an amorphous silicon (α-Si) layer 6 as a photo-conductive layer, a shading layer 7, a dielectric multi-layer film mirror 8, oriented films 9 and 10, and a spacer 11, is arranged between the glass substrates 2 and 3 each having these ITO's 4 and 5. Moreover, anti-reflection coatings 13 and 14 are formed on the outer surface of the glass substrates 2 and 3, respectively.

This optical spatial modulator 1 is used in such a manner that under the condition that the electrode bias is applied between ITO's 4 and 5, the writing light is made incident from the side of the glass substrate 2, and the reading light is made incident from the side of glass substrate 3, the reading light is reflected on the dielectric multi-layer film mirror 8 through the liquid crystal layer 12, and is made emanated from the glass substrate 3 through the liquid crystal layer 12.

Thus, when the writing light is made incident from the side of the glass substrate 2, the resistor or the impedance of the α-Si layer 6 decreases according to the incident intensity of the writing light, so that the voltage applied to the liquid crystal layer 12 through the ITO's 4 and 5 changes according to the intensity of the writing light, and thus the inclination state of the liquid crystal molecule, that is, the refraction index, is changed according to the voltage change, thereby changing the optical path length of the reading light, and modulating the reading light.

Figure 2:
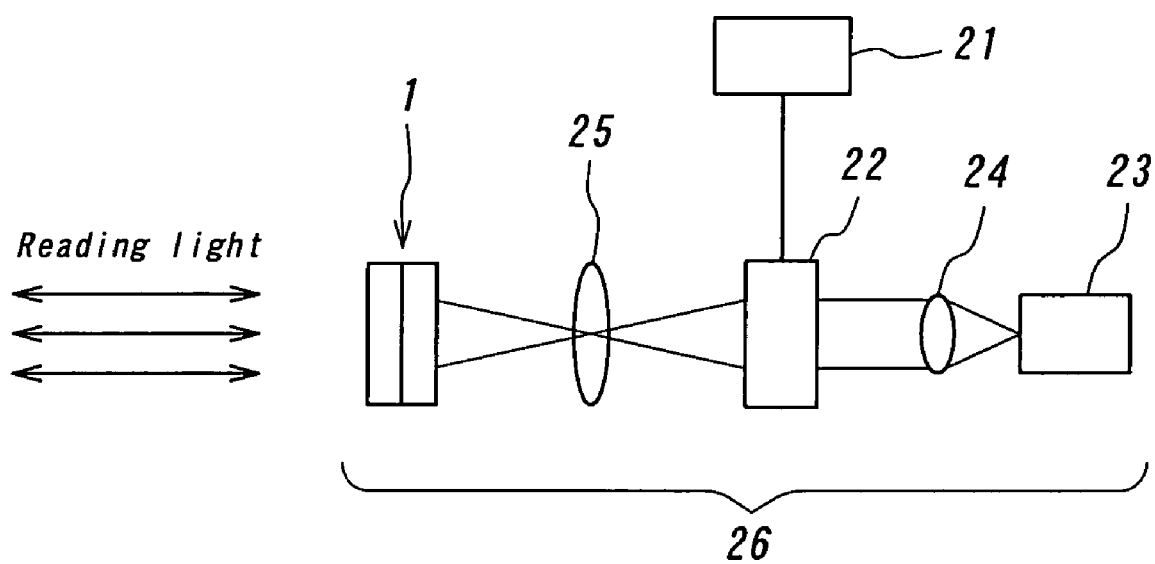
FIG. 2 is a view showing a construction of the optic spatial modulating device having the optical spatial modulator shown in FIG. 1.

The optical spatial modulator 1 shown in FIG. 1 is a modulator of the type called as an optical addressing type for performing the phase control of the reading light in each portion according to the intensity of the writing light. In order to control the phase of the reading light two dimensionally by using the optical spatial modulator 1, for example, as shown in FIG. 2, an optical spatial modulating device 26 is constructed with the optical spatial modulator 1, an electrical signal generator 21 for writing, a liquid crystal display (LCTV) 22, an illumination light source 23, a collimator lens 24, and an imaging lens 25, a computer synthetic hologram (CGH), that is the wavefront compensation data calculated and formed by the computer (not shown), is converted into the video signal by the electrical signal generator 21 for writing and displayed on the LCTV 22, the LCTV 22 is illuminated by the illumination light source 23 through the collimator lens 24, and the displayed image is imaged onto the optical spatial modulator 1 with the imaging lens 25 as a writing light. (for example, refer to Japanese Patent Application Opened No.10,058/2000).

If the above is executed, CGH is reproduced, and the reading light is subjected to modulation, so that the phase of the reading light can be controlled two dimensionally, thereby being able to correct the wavefront.

Figure 3:
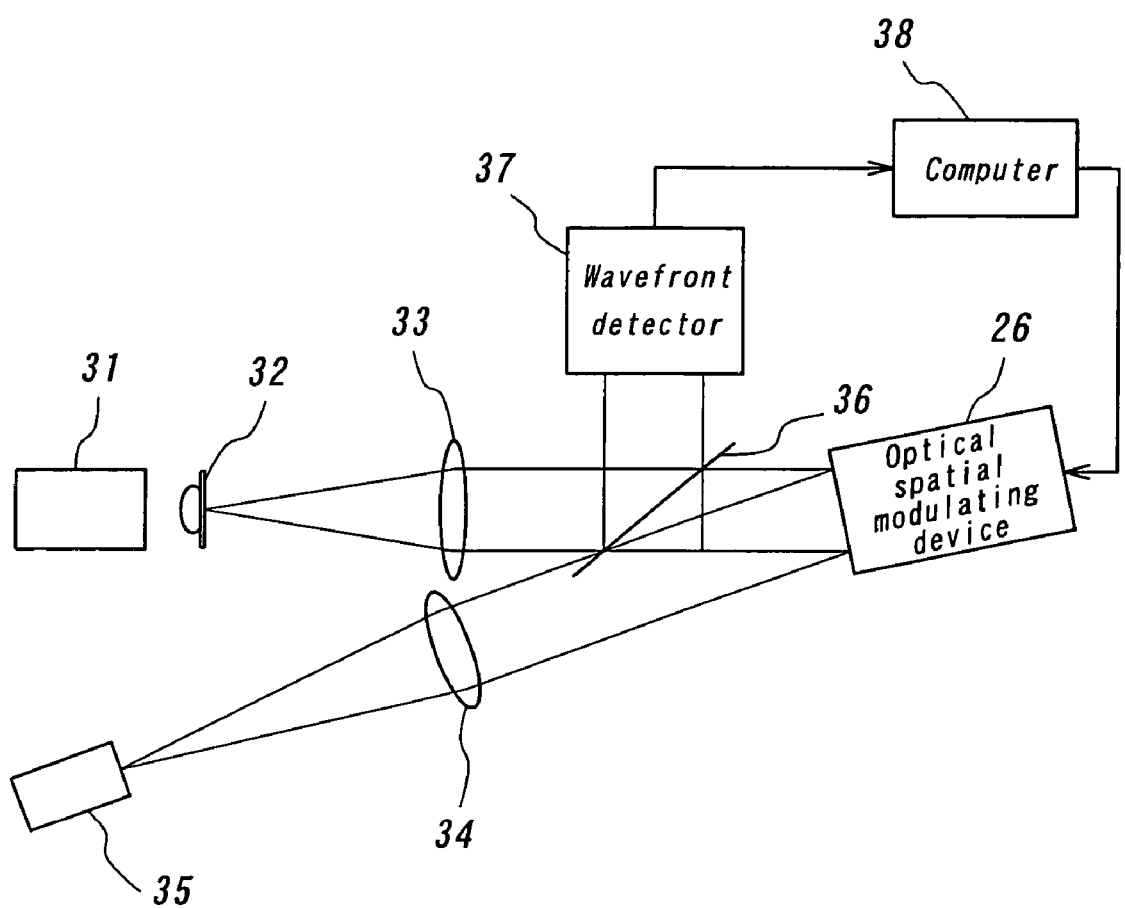
FIG. 3 is a view for explaining the used mode of the optic spatial modulating device shown in FIG. 2.

Here, CGH made by the computer actually detects the target (object) wavefront for the correction, and thus it only has to make the CGH based on the detected wavefront. For example, as shown in FIG. 3, after the laser beam from a laser light source 31 is made a parallel or collimated light with a collimator lens 33 through a spatial filter 32, in the case of the optical system for making the collimated light focused onto a sample 35 by objective lens 34, the laser beam from the collimator lens 33 is reflected on the optical spatial modulator of the optical spatial modulating device 26 and is lead to the objective lens 34, and the laser beam is diverged by arranging a half mirror 36 in the incident light path or the emitted light path (incident light path in FIG. 3) to or from the optical spatial modulator, and then the diverged laser beam is received on a wavefront detector 37, for example, such as Shack Hartman sensor, thereby measuring the wavefront.

Wavefront information detected by the wavefront detector 37 is supplied to a computer 38, herein, CGH (wavefront compensation data) for obtaining the desired wavefront based on the inputted wavefront information, is calculated, the calculated CGH is supplied to the optical spatial modulating device 26, and herein, is converted into the video signal as explained in FIG. 2 thereby displaying it on LCTV, and then the spatial modulation of the laser beam according to the optical spatial modulator is fed back and controlled by imaging the displayed image onto the optical spatial modulator of the optical spatial modulating device 26 as a writing light.

Figure 4:
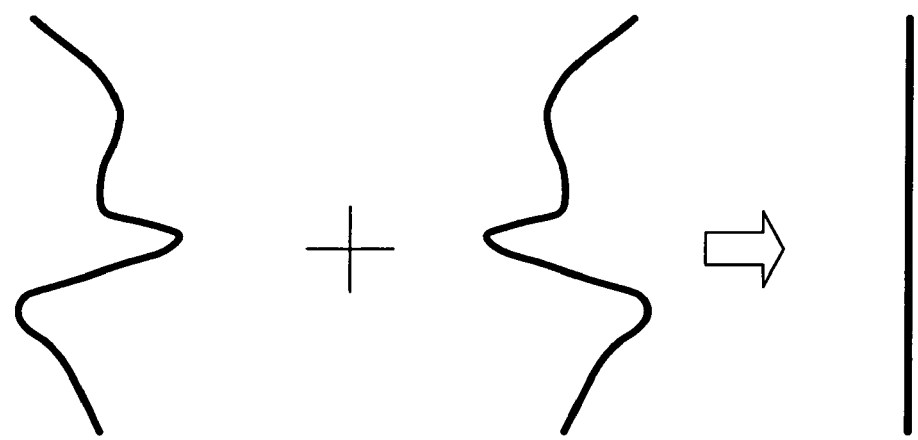
FIG. 4 is a view for explaining the wavefront compensation principle in the construction shown in FIG. 3.

For example, in the case of obtaining the laser beam of the uniform wavefront, when the wavefront detected by the wavefront detector 37 is in a shape shown in FIG. 4(a), the uniform output wavefront as shown in FIG. 4(c) is obtained by forming the wavefront shown in FIG. 4(b) with the shape opposite to one of the detected wavefront in the optical spatial modulator.

Moreover, the wavefront compensation means is not limited to the optical spatial modulator of an optical addressing type shown in FIG. 1, and but may use an optical spatial modulator of an electric addressing type such as LCTV, and as the wavefront compensation means, the phase plate and other optical spatial modulators, etc. are arranged in the optical path, and thus the wavefront correction pattern can also be formed on the output plane by the technique of hologram etc. Moreover, the desired wavefront can also be obtained in the same way as the above by forming the pattern, in which the pattern of the wavefront correction and the pattern of the hologram etc. are overlapped by one optical spatial modulator, as a phase pattern.

The optical spatial modulator mentioned above is inserted in the light source optical system of the super-resolution microscope, and the wavefront aberration generated until the coherent light reaches from the light source to the sample is removed, thereby being able to form an ideal hollow beam as an erase light, as a result thereof, a super-resolution near the limit can be generated, and thus the spatial resolution can be improved.

Embodiment

Hereafter, the embodiment of the microscope according to the present invention is explained in detail with reference to the drawing.

Figure 5:
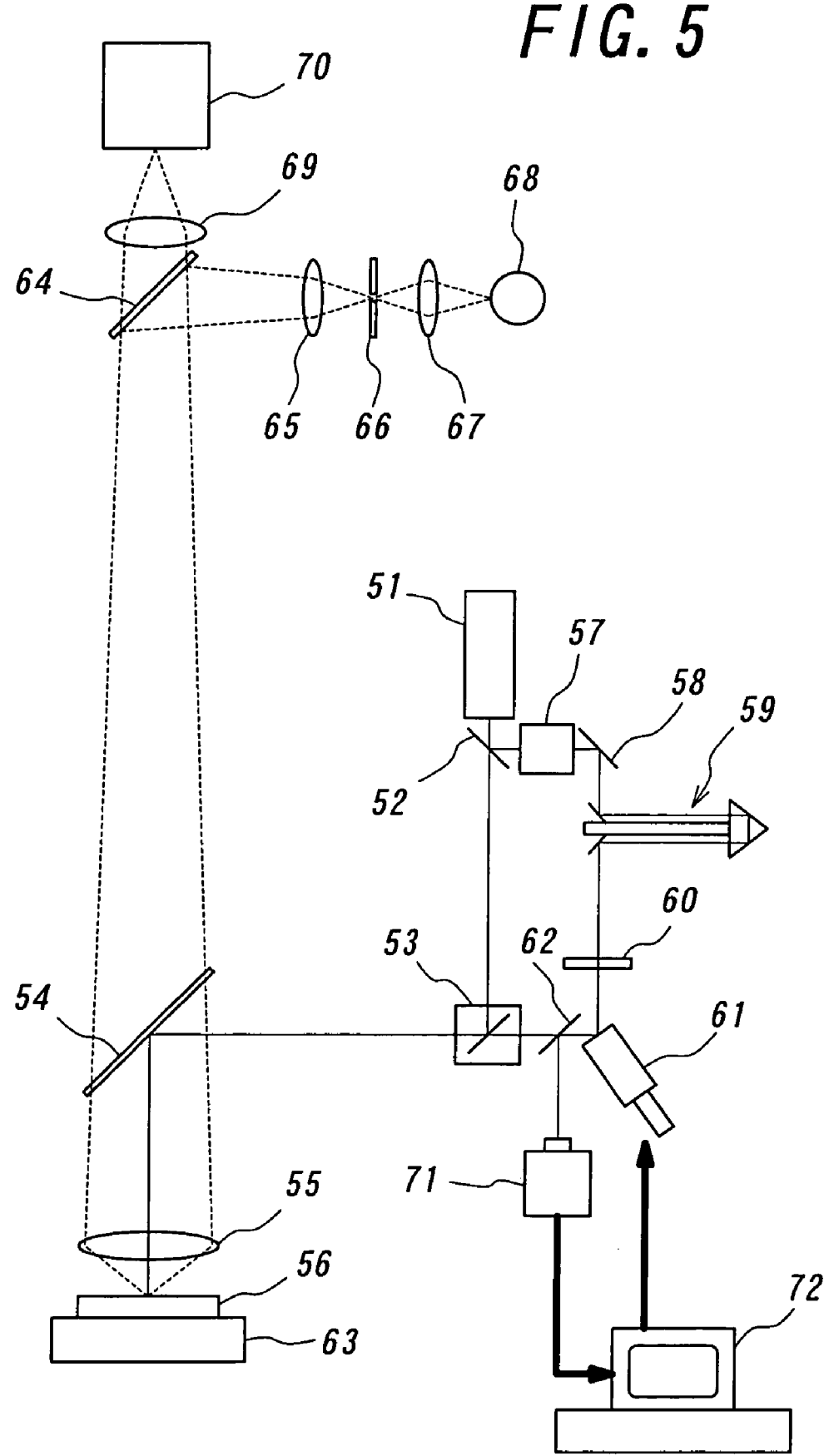
FIG. 5 is a schematic constructional view of the super-resolution microscope showing the first embodiment of the present invention.

FIG. 5 is a view showing the principal structural portion of an optical system in first embodiment according to the present invention. The microscope in the present embodiment shows a super-resolution fluorescent microscope of the laser scanning type, in which the super-resolution is developed to improve the spatial resolution by spatially modulating both the pump light and the erase light. Hereafter, the case that the biological sample dyed with rhodamine 6G is observed, is explained as an example.

It has been confirmed that the rhodamine 6G has an absorption band excited from the normal state (S0) to the first electron excited state (S1) in the neighborhood of the wavelength 530 nm, and has the double resonance absorption band excited from first electron excited state (S1) to electron excited state with higher energy level near the wavelength 600 nm. (For example, refer to E. Sahar and D. Treves: IEEE is J. Quantum Electron to QE-13,692(1977)).

Then, in this embodiment, a Nd:YAG pulse laser 51 is used as a light source, the second harmonics (532 nm) thereof is diverged into two coherent luminous flux by an beam splitter 52, and one of the luminous flux is reflected by a beam combiner 53 and a half mirror 54 as a pump light (first light) and is made focused onto a sample 56 by an objective lens 55.

Moreover, the other luminous flux diverged by the beam splitter 52 is made incident on the Raman shifter 57 consisting of Ba(NO3) 2 crystals, and the coherent induced Raman light with wavelength 599 nm emanated from the Raman shifter 57 is used as an erase light (second light).

Figure 18:
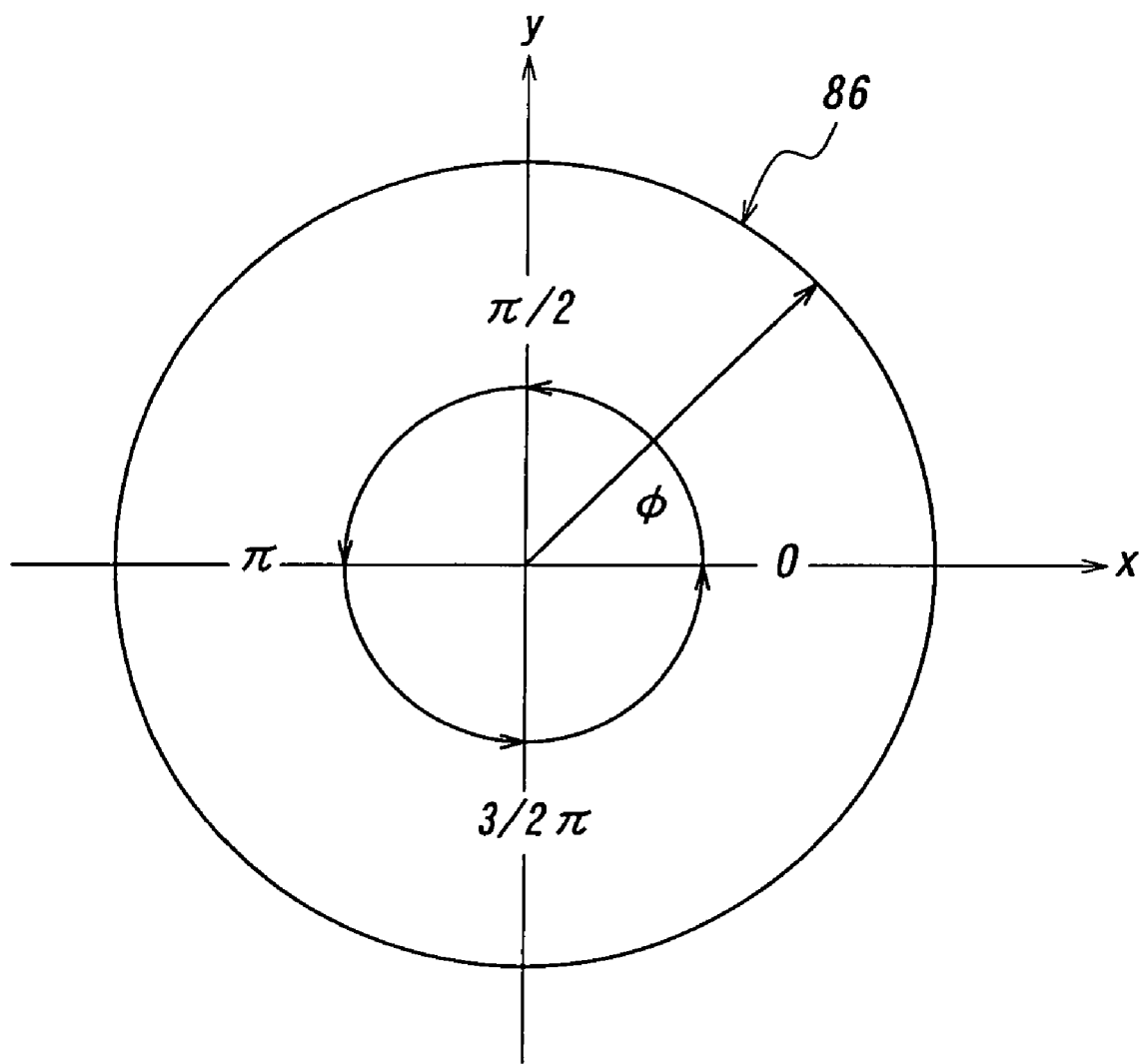
FIG. 18 is a plan view showing the construction of the phase plate shown in FIG. 17.
Figure 19:
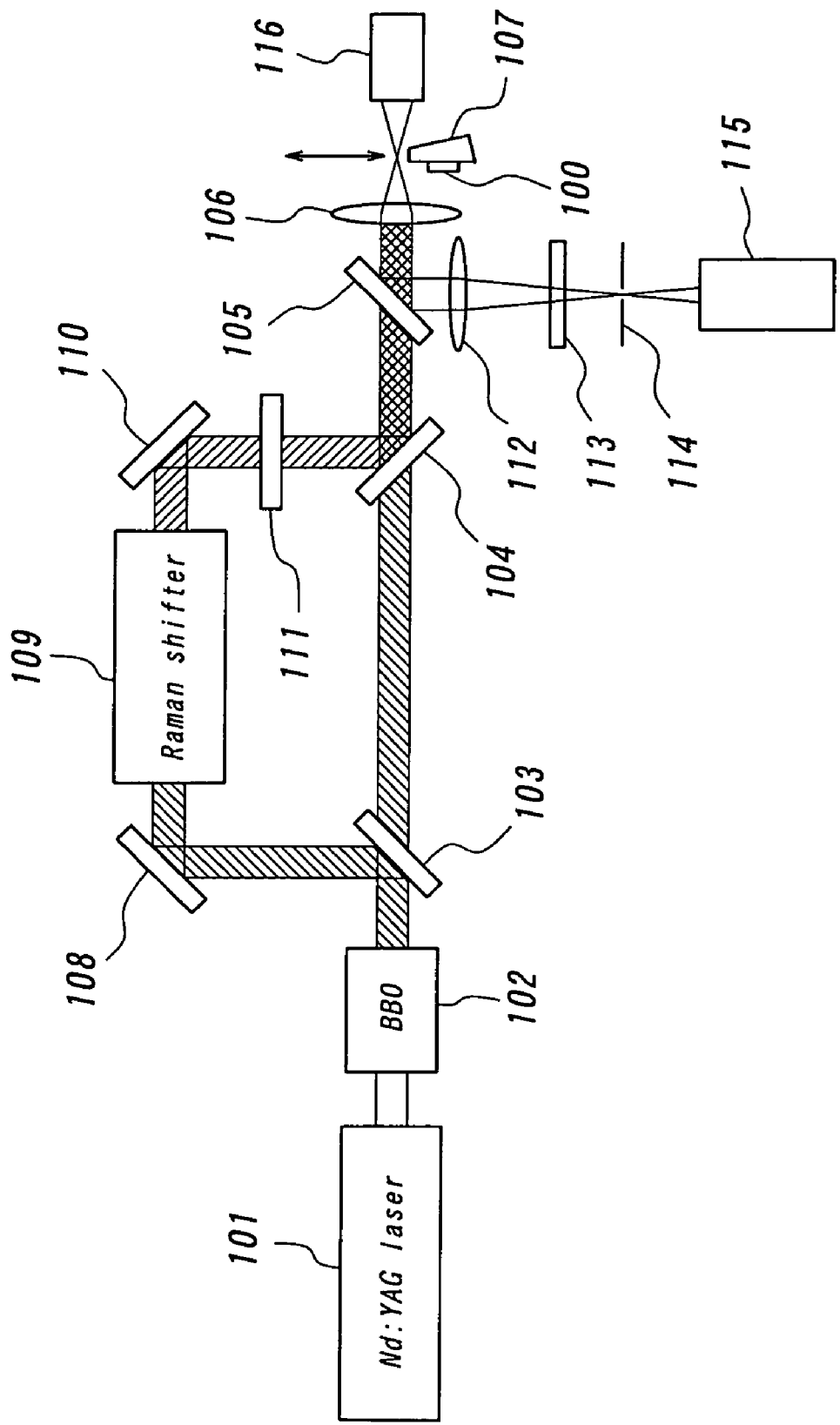
FIG. 19 is a view showing a construction of other examples of the conventional super-resolution microscope.

The erase light emanated from the Raman shifter 57 is incident onto the phase plate 60 of construction shown in FIG. 18 through a delay optical system 59 for matching the irradiation timing of a mirror 58 and the pump light, thereby performing spatial phase-modulation into the hollow beam. The erase light made a hollow beam is made incident on an optical spatial modulating device 61 in the spatial phase modulation means shown in FIG. 2 as the wavefront compensation means, and then is synthesized on the same axis as the pump light to focus onto the sample 56 through the half mirror 54 and the objective lens 55 by making the erase light diffracted herein incident onto the beam combiner 53 through a beam sampler 62. Moreover, the spatial phase modulation machine constructing the optical spatial modulating device 61 uses an optical spatial modulator of phase control type having, for example, the liquid crystal of the double refraction control type shown in FIG. 1.

The sample 56 is put on a sample stage 63, and the sample 56 is scanned two-dimensionally by the pump light and the erase light by two dimensionally driving the sample carried stage 63.

On the other hand, after passing through the objective lens 55, the fluorescence emanating from the sample 56 by the irradiation of the pump light and the erase light is made transmitted through the half mirror 54, in addition, is reflected on the half mirror 64, and is made focused onto the center of a pinhole 66 by the lens 65, and then is make incident on the photo multiplier 68 by the lens 67, thereby detecting the fluorescence by the photo multiplier 68. Here, the pinhole 66 is arranged at the confocal position, and functions as a spatial filter. This functions for increasing the signal to noise ratio of the measurement by cutting stray light such as scattered light from the optical system, for example, emitting from other than the sample 56 and so on, at the same time, has the function of the optical sectioning that chooses only the signal of the tomography of specific depth in sample 56.

Moreover, fluorescence passed through the half mirror 64 is imaged by a CCD camera 70 having an imaging lens 69, thereby being able to direct observe the fluorescent spot image, and utilizing the focusing etc. of the objective lens 55.

In this embodiment, a part of the erase light made a hollow beam by the phase plate 60 is taken out by the beam sampler 62, and the spatial phase distribution thereof is measured by a wavefront measuring device 71.

For example, the wavefront measuring device 71 comprises two dimensional CCD and two dimensional micro-lens array arranged forward of the light receiving plane thereof, and uses the wavefront measuring device of the Shack Hartman type to focus each micro-lens onto the CCD light receiving plane by dividing the pupil plane of incident light with two dimensional micro-lens arrays, (For example, France: HASOII made by Imagine Optic company).

The wavefront measuring device 71 is constructed in such a manner that when the wavefront with a uniform phase distribution is incident, light passed through the respective pupil planes divided by the micro-lens array is focused onto the CCD light receiving plane under the quietly same conditions, when the wavefront with a non uniform phase distribution is incident, the focusing characteristic caused by generation of spatial positional shift is utilized, and the positional shift is converted into the phase shift and thus the data concerning the phase distribution in the pupil plane is outputted.

The measured result of the spatial phase distribution of the erase light in the wavefront measuring device 71 is supplied to a control computer 72, and herein, the wavefront compensation data for compensating the disorder of the wavefront of the erase light is operated based on the measured result. The wavefront compensation data is supplied to the optical spatial modulating device 61, the wavefront compensation pattern based on the wavefront compensation data is imaged onto the optical spatial modulator as explained in FIG. 2, the refractive index distribution is given to the liquid crystal diffraction plane, as a result, the erase light is spatially modulated to remove the wavefront aberration of the erase light in the optical system.

Moreover, the spatial modulation of the erase light by the optical spatial modulating device 61 is controlled by feed-backing the measured result in the wavefront measuring device 71 until the erase light becomes an ideal hollow beam.

Thus, in this embodiment, the spatial phase distribution of the erase light made a hollow beam by the phase plate 60 is measured by the wavefront measuring device 71, the disorder of the wavefront is compensated based on the measured result and the erase light is spatially modulated by the optical spatial modulating device 61, so that the erase light can be beam-shaped into the complete hollow shape. Therefore, a super-resolution near the limit can be achieved, and the spatial resolution can be improved.

Figure 6:
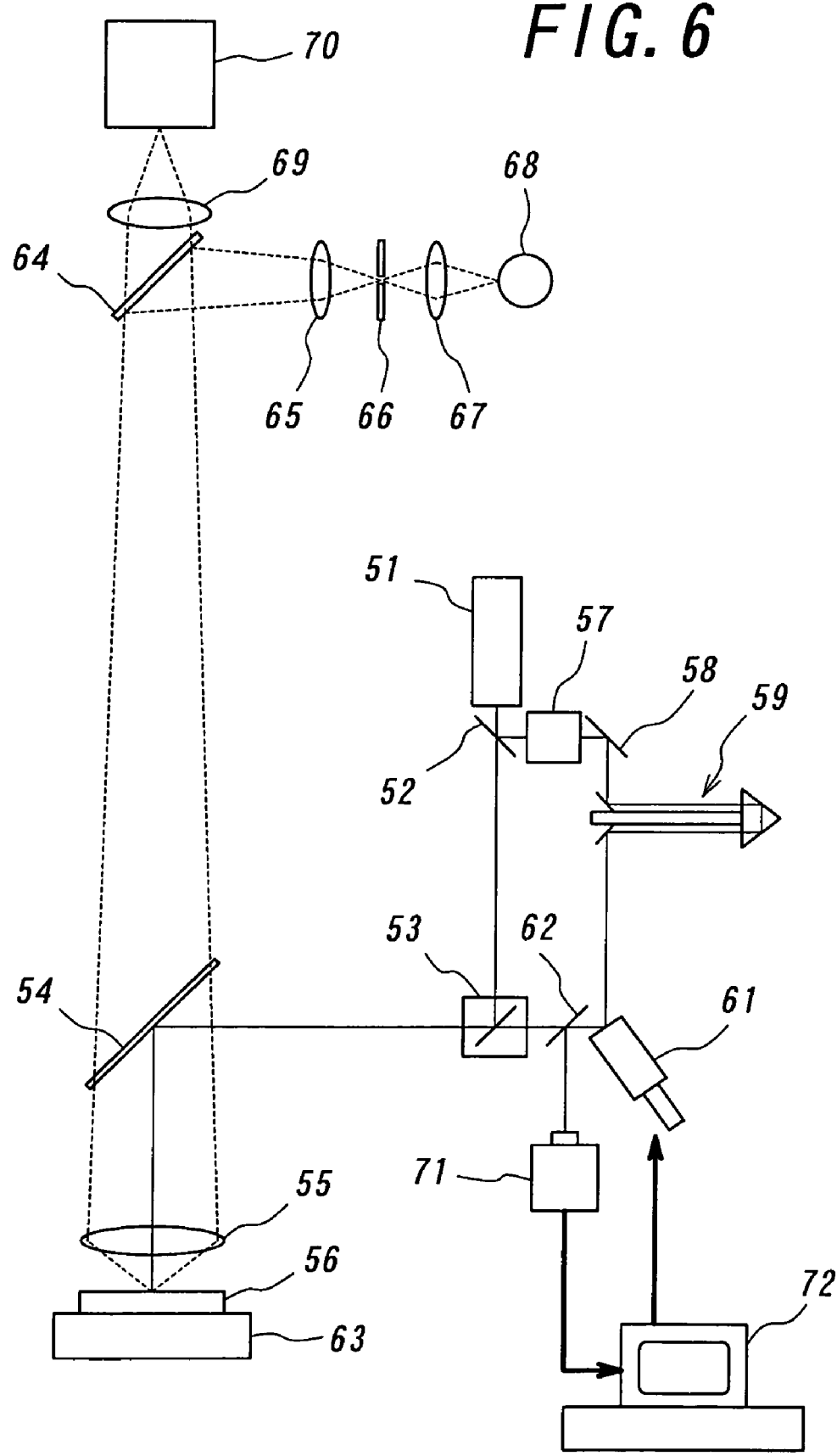
FIG. 6 is a schematic constructional view of the super-resolution microscope showing the second embodiment, similarly.

FIG. 6 is a view showing the principal structural portion of the optical system in second embodiment according to the present invention. The microscope of the present embodiment is a microscope that also provides the function of making the erase light a hollow beam for the optical spatial modulating device 61, and omits the phase plate 60, in the constitution shown in FIG. 5.

Here, if the wavefront of the erase light is completely uniform, the erase light can be shaped into the ideal hollow shape beam without disorder of the wavefront, by imposing a phase distribution to the liquid crystal diffraction plane of the optical spatial modulator that constructs optical spatial modulating device 61 as shown in FIG. 18 for the wavelength of the erase light, and thus the erase light can be shaped into the ideal hollow shape beam. Moreover, even though the wavefront of the erase light incident on the optical spatial modulator has fallen into disorder, if the disorder of the wavefront is measured by wavefront measuring device 71 by control computer 72, thereby operating the wavefront compensation data, the wavefront compensation data is superimposed to the phase distribution shown in FIG. 18 and is supplied to the optical spatial modulating device 61, a shaping of the hollow beam shaping and a wavefront compensation can be performed at the same time.

Figure 7:
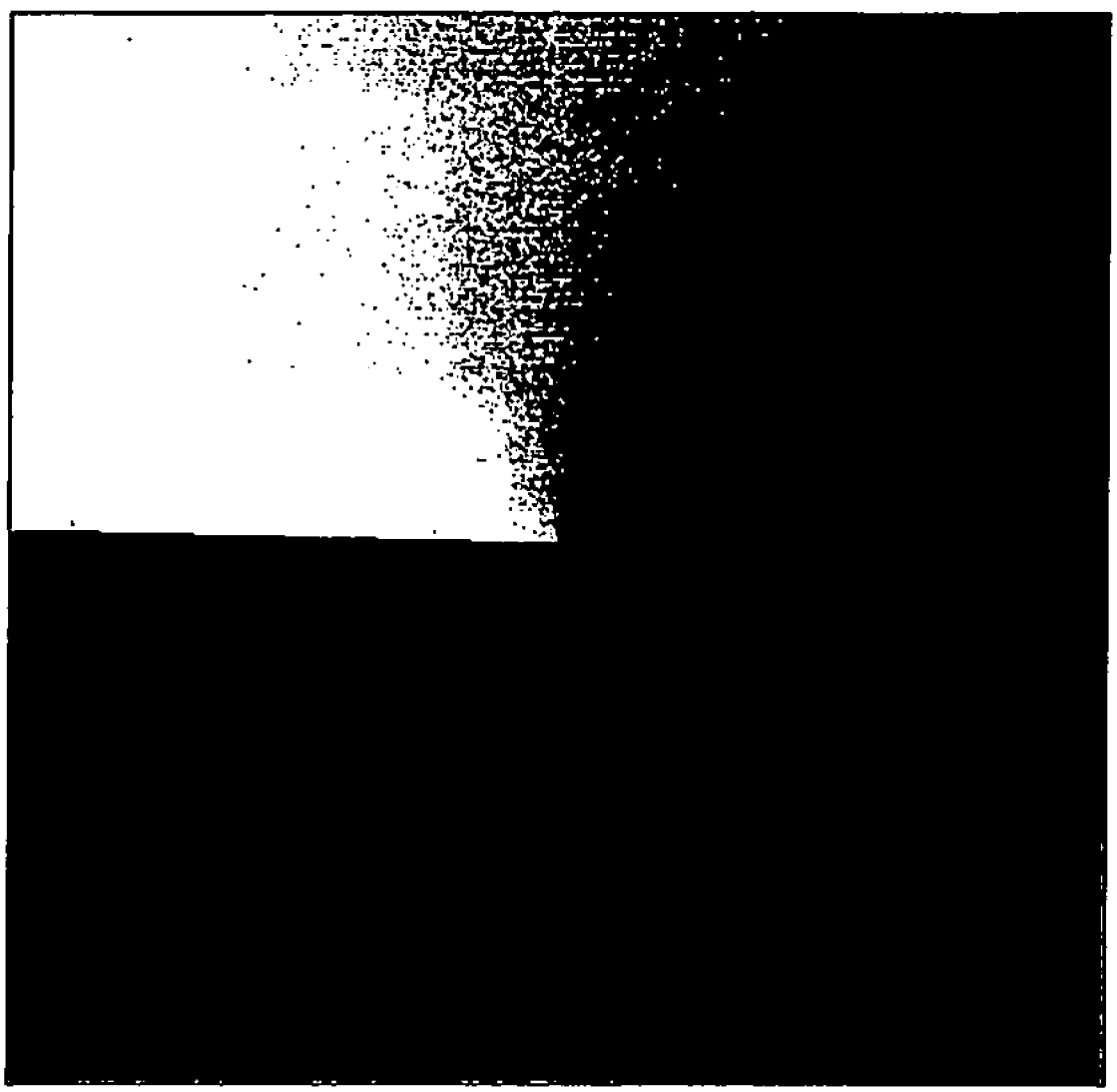
FIG. 7 is a view showing the spatial intensity distribution of the writing light in the optic spatial modulating device when the erase light is made a hollow beam, in the construction shown in FIG. 6.

Therefore, in this embodiment, the phase pattern as shown in FIG. 18 is written on the liquid crystal diffraction plane of the optical spatial modulator for constructing the optical spatial modulating device 61, so that the erase light is made diffracted as a hollow beam. FIG. 7 shows the spatial intensity distribution of the writing light (back light) to be made imaged to the optical spatial modulator at this time, the light intensity distribution of the back light is increased spirally and continuously so as to go around the center point of the liquid crystal diffraction plane, and the back light in the optical writing region with the highest intensity has a phase difference of $2\pi$ to the incident light of the erase light wavelength.

Figure 8:
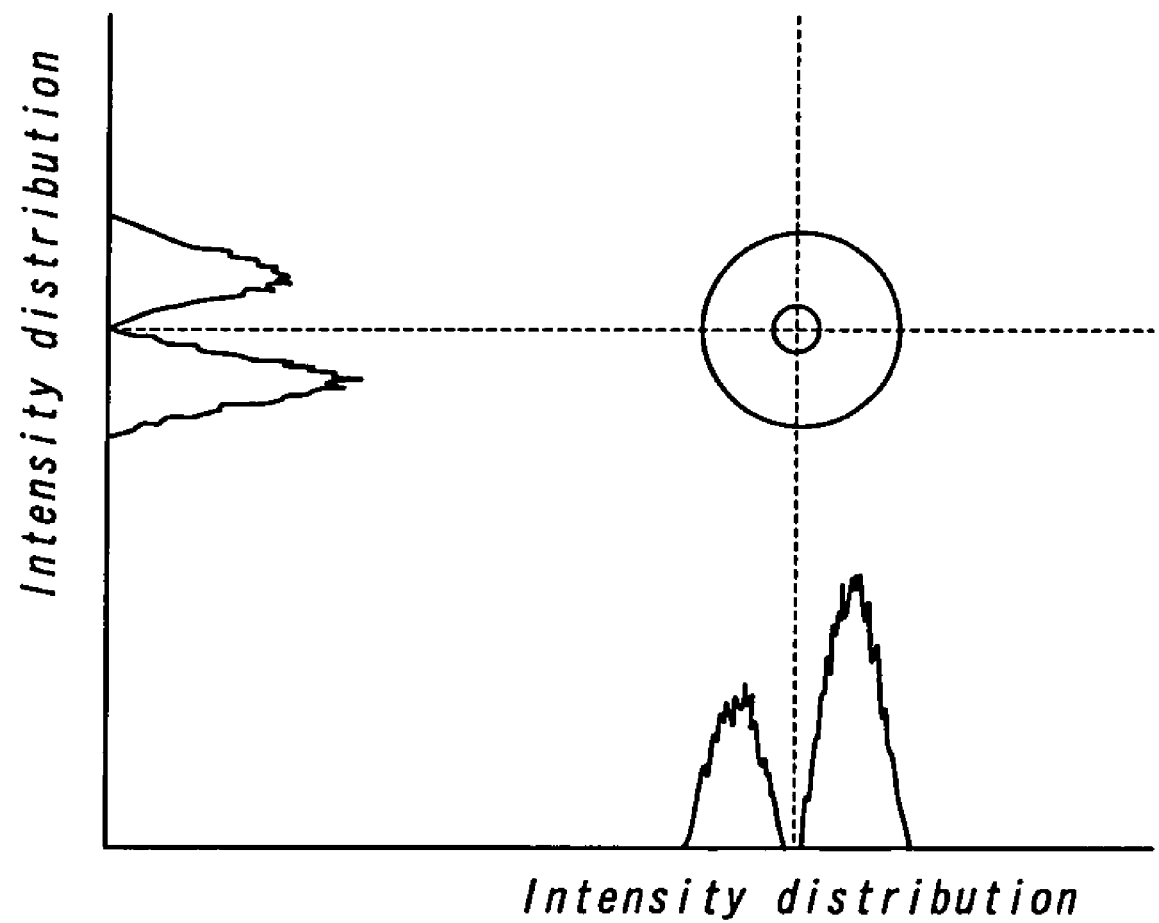
FIG. 8 is a view showing an expanded focused beam shape and the light intensity distribution of the erase light in the case of making only the erase light into a hollow beam by the optical spatial modulating device in the construction shown in FIG. 6.

However, only, the erase light is only made a hollow beam by the optical spatial modulating device 61, the beam shape of the erase light focused onto the sample 56 is made a hollow shape, for example, as shown in FIG. 8 with enlarged scale, but the optical intensity is a non-uniformity, and does not become an optical axis symmetry. This depends on non-uniformity in the wavefront of laser beam emanated from the Nd:YAG pulse laser 51, the wavefront aberration generated by Raman shifter 57, and besides, phase shift etc. generated by the optical element that exists in the optical path.

Then, in this embodiment, the wavefront of the erase light is measured by a wavefront measuring device 71, thereby operating the wavefront compensation data with a control computer 72, the wavefront compensation data is superimposed to the phase distribution data for making a hollow beam and is supplied to the optical spatial modulating device 61, thereby performing a shaping of the hollow beam and a wavefront compensation at the same time.

Figure 9A:
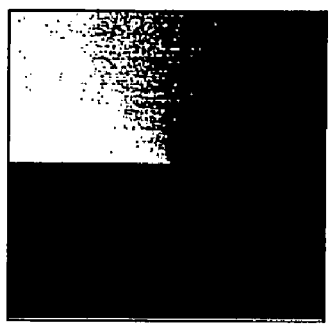
FIG. 9 is a view for explaining the spatial intensity distribution of the writing light in the optic spatial modulating device according to the second embodiment.
Figure 9B:
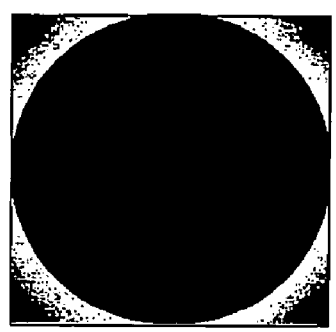
Figure 9C:
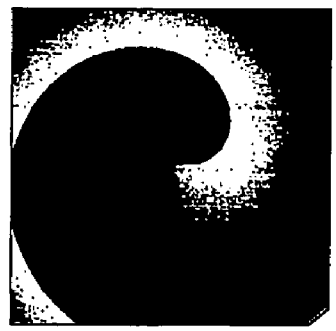
Figure 10:
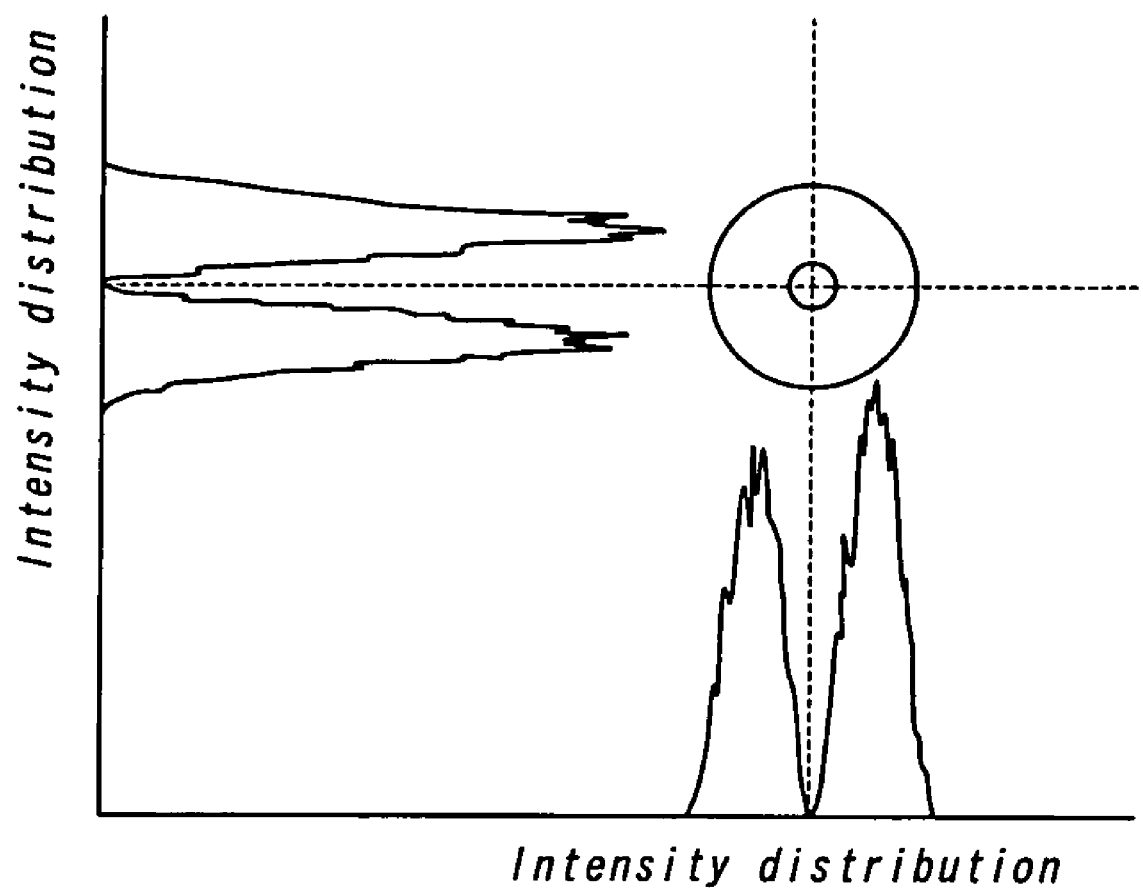
FIG. 10 is a view showing the magnified focused beam shape and the light intensity distribution of the erase light in the second embodiment.
Figure 11:
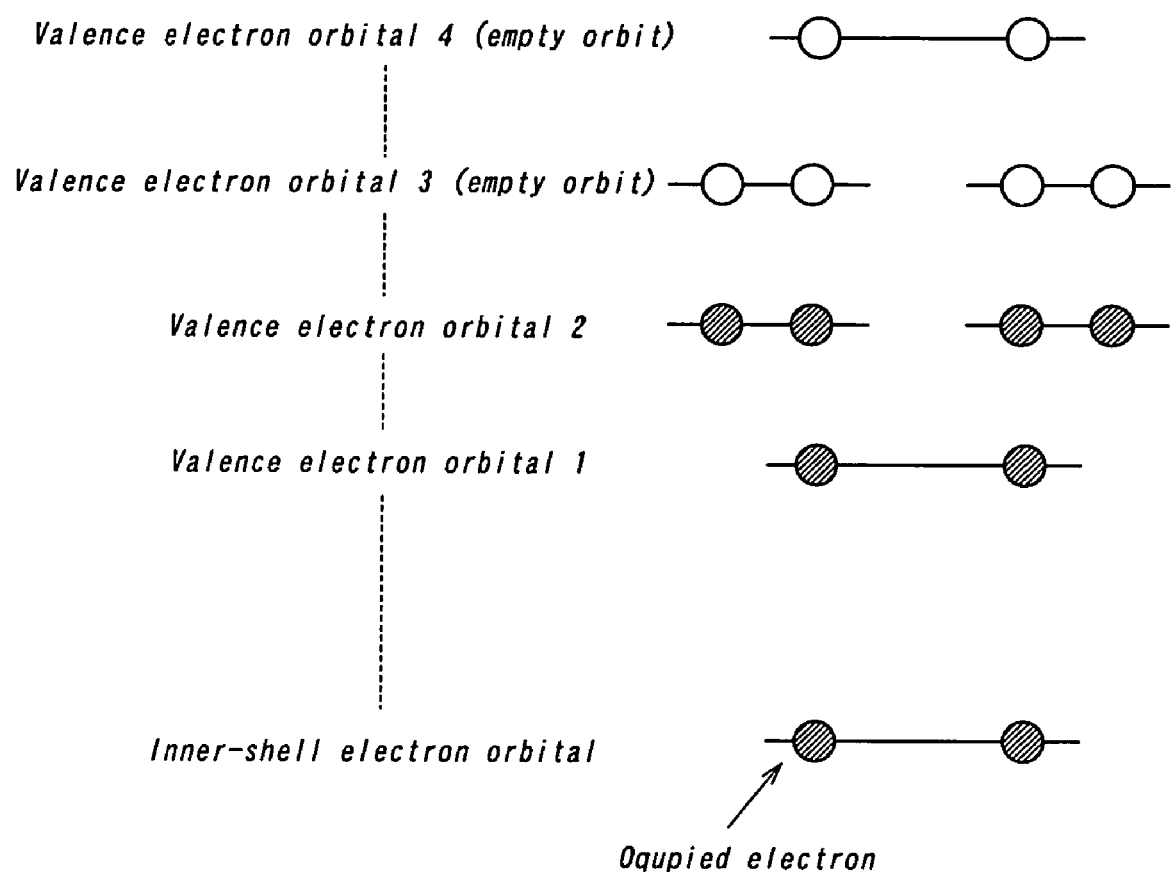
FIG. 11 is a conceptual diagram showing structure of electron in valence electron orbital of molecule constructing the sample.
Figure 12:
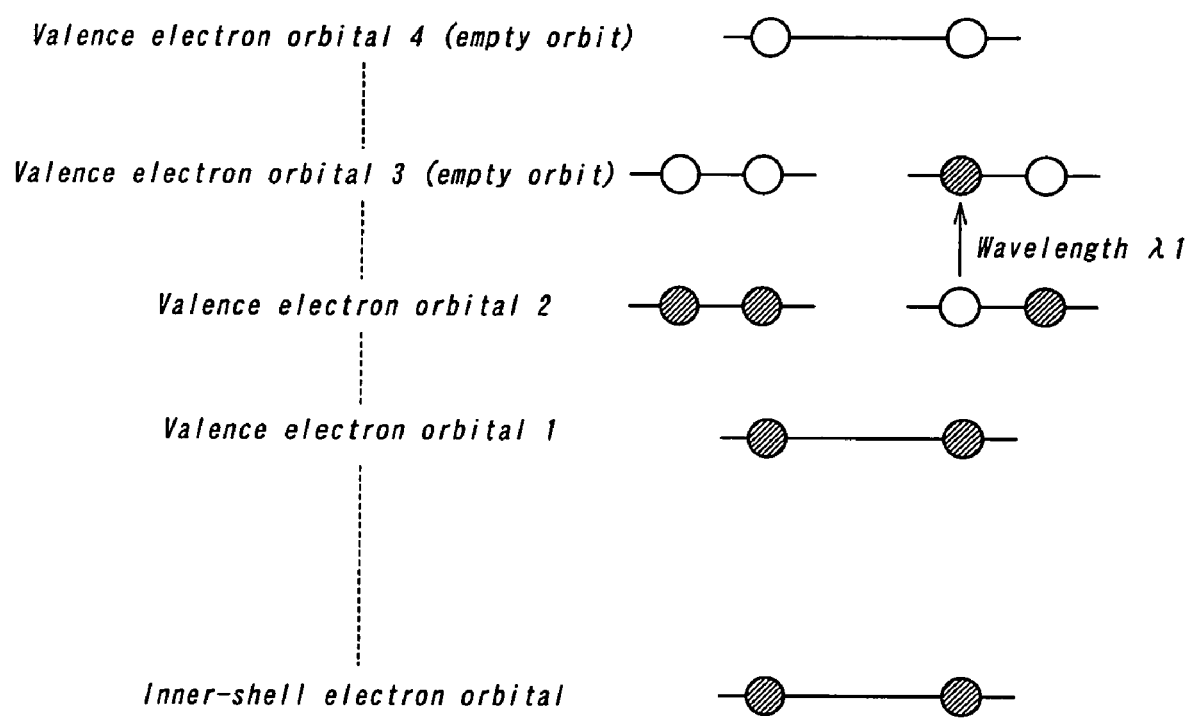
FIG. 12 is a conceptual diagram showing the first excited state of the molecule shown in FIG. 11.
Figure 13:
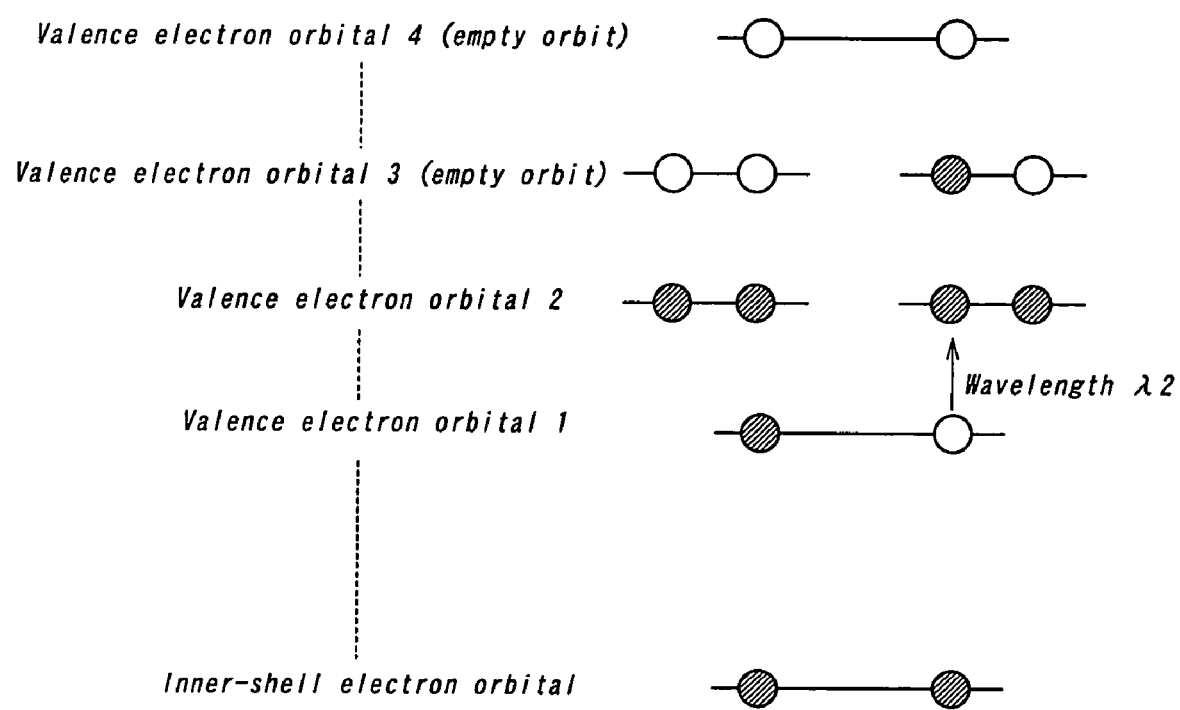
FIG. 13 is a conceptual diagram showing the second excited state of the molecule, similarly.
Figure 14:
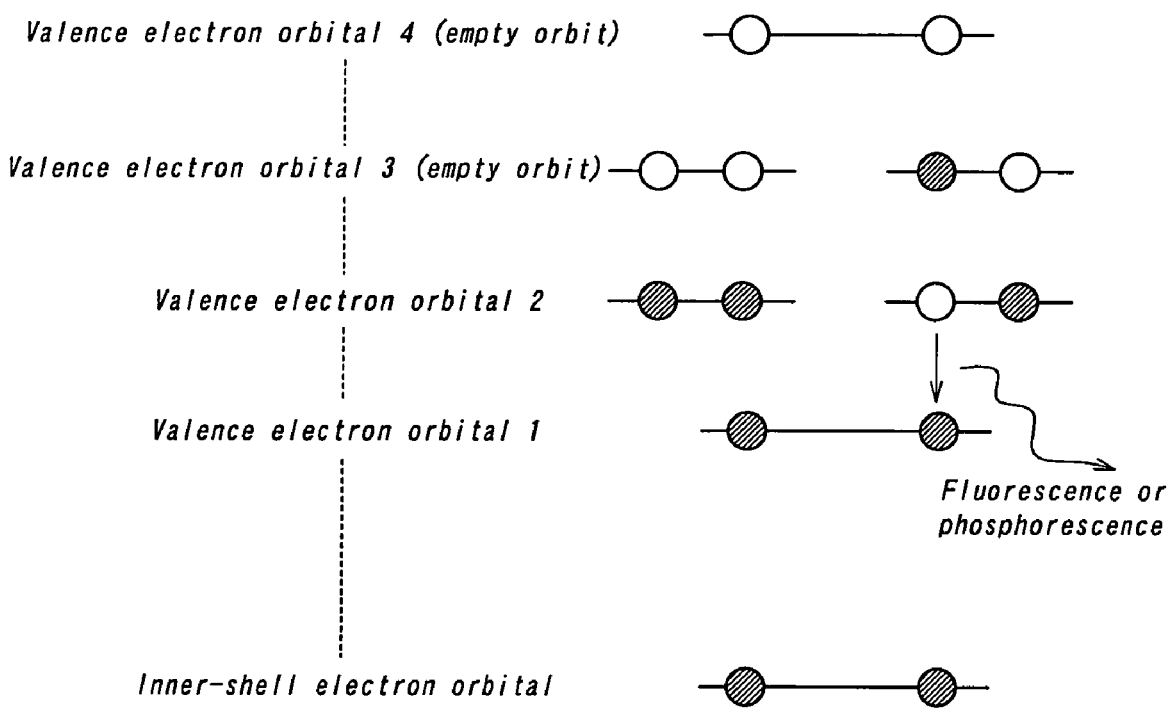
FIG. 14 is a conceptual diagram showing the state that returns from the second excited state to the ground-state, similarly.
Figure 15:
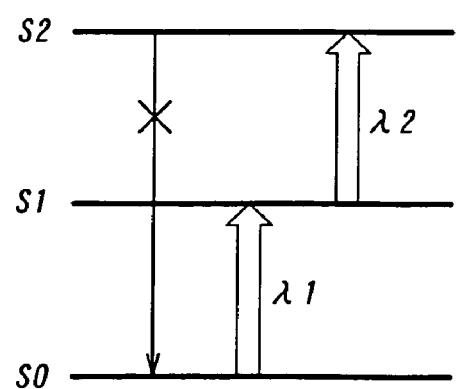
FIG. 15 is a conceptual diagram for explaining the double resonance absorption process in the molecule.
Figure 16:
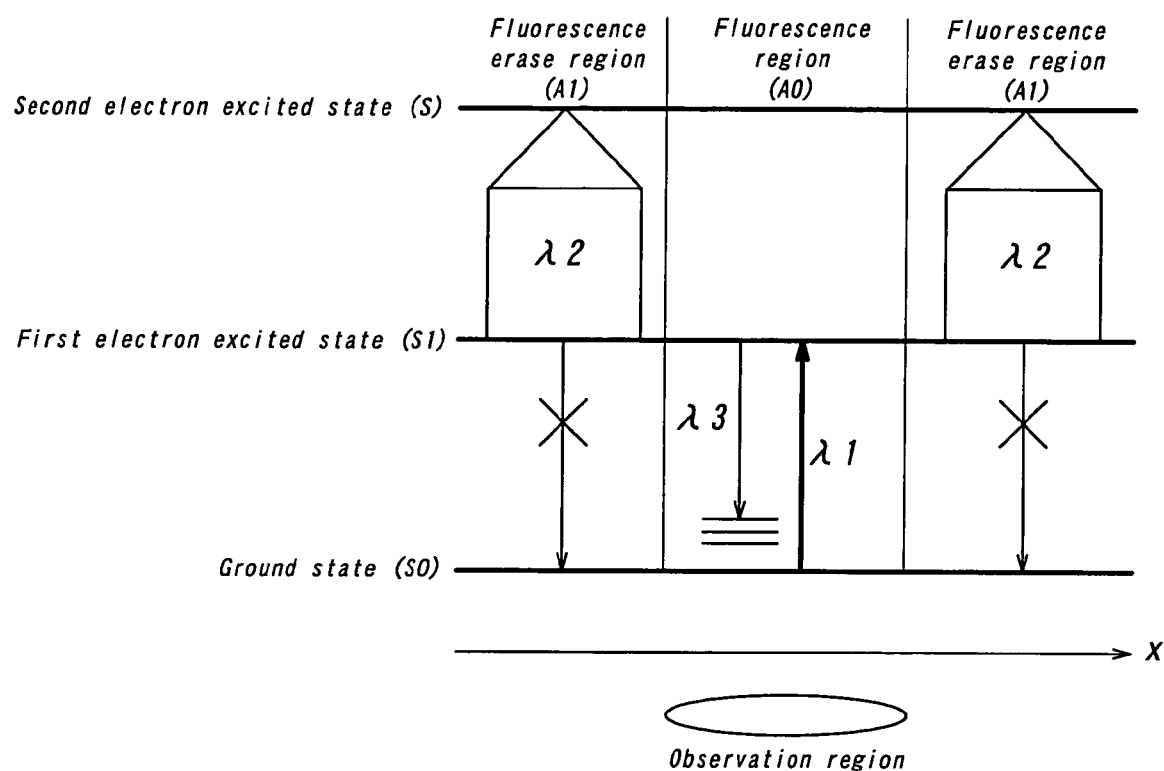
FIG. 16 is a conceptual diagram for explaining the double resonance absorption process, similarly.
Figure 17:
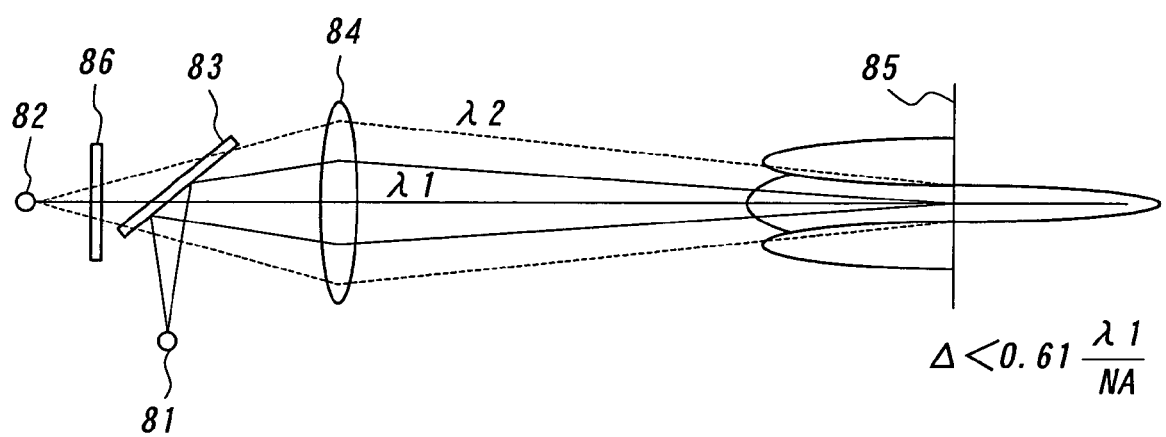
FIG. 17 is a view showing a construction of one embodiment of the conventional super-resolution microscope.

If the above is executed, the back light with the spatial intensity distribution as shown in FIG. 9(c) formed by superimposing a spatial intensity distribution shown in FIG. 9(a) to generate the erase light with hollow-beam and a spatial intensity distribution shown in FIG. 9(b) for example to compensate the wavefront of the erase light based on measured result in a wavefront measuring device 71, is written in the optical spatial modulator constructing the optical spatial modulating device 61, as a result, the erase light focused onto the sample 56 can be made an uniform hollow beam with the optical axis symmetry completely as shown in FIG. 10 with magnified scale.

Therefore, even in the present embodiment, in the same way as the first embodiment, a resolution with almost super-resolution size can be generated, and furthermore the spatial resolution can be improved. Moreover, in this embodiment, the hollow beam shaping and the wavefront compensation of the erase light are performed by the optical spatial modulating device 61 without using the phase plate, so that the number of parts can be reduced more than the case in the first embodiment, and reduction in costs by the amount thereof can be achieved.

Moreover, the present invention is not limited to only the above embodiments, and thus many variations or modifications can be carried out. For example, in the above embodiments, the pump light and the erase light are obtained by using one Nd:YAG pulse laser 51, but the light source for radiating the pump light and the light source for radiating the erase light can be independently provided to each other.

Moreover, in the above embodiments, The optical spatial modulating device is constructed so as to compensate the wavefront of the erase light, but, the optical spatial modulating device is also constructed so as to compensate the wavefront of the pump light by arranging, for example, the optical spatial modulator in the optical path of the pump light, or for example, the optical spatial modulator is arranged in the optical path of the erase light and the optical path of the pump light, respectively, thereby wavefront-compensating both the erase light and the pump light.

In this embodiment, the liquid crystal type spatial modulator is introduced as a wavefront compensating means, and moreover, a deformable mirror (variable shaped mirror) and a micro-mirror array capable of removing the wavefront aberration, can be used by freely changing the spatial shape of the mirror with the power generation element array plane-arranged in two dimensionally.

What is claimed is:

1. A microscope comprising:
   a spatial phase modulator for spatial phase-modulating, into a predetermined beam shape, a first light to excite a molecule from a ground-state to a first electron excited state or a second light to excite the molecule from the first electron excited state to the second electron excited state with higher energy level, for the sample including the molecule with three electronic states including at least a ground-state;
   a focusing section for focusing and overlapping a part of these first light and second light;
   a light detector for detecting light generated from the sample;
   a wavefront compensator provided in an optical path in the above first light and/or an optical path in the above second light; and
   a wavefront aberration removal section for removing wavefront aberration caused in the first light and/or the second light by the wavefront compensator.

2. The microscope as claimed in claim 1, wherein the wavefront compensator has an optical spatial modulator.

3. The microscope as claimed in claim 2, wherein the optical spatial modulator contains a liquid crystal type spatial modulator, a deformable mirror or a micro-mirror array.

4. The microscope as claimed in claim 2, wherein the optical spatial modulator is so constructed that the first light or the second light is spatial phase modulated to the prescribed beam shape.

5. The microscope as claimed in claim 2, wherein a spatial phase distribution measuring portion for measuring the spatial phase distribution of the above first light and/or the second light, is provided, and the first light and/or the second light are spatially modulated by the optical spatial modulator based on the spatial phase distribution measured in the spatial phase distribution measuring portion.

6. The microscope as claimed in claim 5, wherein the optical spatial modulator is so constructed that the first light or the second light is spatial phase modulated to the prescribed beam shape.

7. The microscope as claimed in claim 5, wherein a control unit for feedback controlling the spatial modulation of the first light and/or the second light according to the optical spatial modulator is provided by generating the wavefront compensation data based on the spatial phase distribution measured with the spatial phase distribution measurement portion.

8. The microscope as claimed in claim 7, wherein the optical spatial modulator is so constructed that the first light or the second light is spatial-phase modulated to the prescribed beam shape.

9. A microscope comprising:

a means for spatial phase-modulating, into a predetermined beam shape, a first light to excite a molecule from a ground-state to first electron excited state or a second light to excite the molecule from the first electron excited state to the second electron excited state with higher energy level, for the sample including the molecule with three electronic states including at least a ground-state;

a means for focusing and overlapping a part of these first light and second light;

a means for detecting light generated from the sample;

a means for wavefront compensation provided in an optical path in the above first light and/or an optical path in the above second light; and a means for removing wavefront aberration caused in the first light and/or the second light by the wavefront compensator.

* * * * *